United States Patent [19]

Grant et al.

[11] Patent Number: 4,848,400
[45] Date of Patent: Jul. 18, 1989

[54] ROTARY FLUID COUPLING

[75] Inventors: Robert W. Grant; Bruce T. Mackedanz, both of Excelsior, Minn.

[73] Assignee: FSI International, Inc., Chaska, Minn.

[21] Appl. No.: 158,194

[22] Filed: Feb. 19, 1988

[51] Int. Cl.⁴ ............................................. F16L 27/08
[52] U.S. Cl. ................................... 137/580; 137/581; 137/312; 137/313; 137/375
[58] Field of Search ............... 137/312, 580, 581, 375, 137/313

[56] References Cited

U.S. PATENT DOCUMENTS

| | | | |
|---|---|---|---|
| 961,216 | 6/1910 | Dow | 137/312 X |
| 2,561,246 | 7/1951 | Thomson | 137/580 X |
| 2,913,002 | 11/1959 | Janas | 137/580 |
| 3,333,598 | 8/1967 | Schott | 137/312 |
| 4,601,087 | 7/1986 | Kawai et al. | 137/375 X |
| 4,726,397 | 2/1988 | Stich | 137/580 |

*Primary Examiner*—John Rivell
*Attorney, Agent, or Firm*—Faegre & Benson

[57] ABSTRACT

The rotary fluid coupling decreases the possibility of microcontaminates entering the fluid flow line and is thus especially suitable for processing equipment in manufacturing of wafers and other components for the microcomputer industry. The rotary fluid coupling interconnects a fluid conveying passageway and a spindle element to a duct in a second element such that the two elements are rotatable with respect to each other. An axial channel is provided along the length of the spindle. A planar faced plate is mounted on the spindle. A bore in the spindle plate is in axial alignment with the spindle channel, generally forming a single continuous fluid conveying passageway. A second element has a generally planar distal faced plate. A fluid conducting duct extends from an aperture on the distal face of the second plate to a fluid source with the two faces generally aligned in parallel relationship to each other creating a fluid permeable gap. A fluid flow resistant labyrinth may be provided on one or both faces. In use, fluid flowing from the fluid source through the fluid conducting duct and the aperture in the second element crosses the fluid permeable gap to enter the fluid conveying passageway in the spindle elements. Synthetic resin coating is further provided within the fluid conveying passageway of the spindle element serving to prevent microcontaminates from being generated by corrosion of the metallic surface by the action of the fluid flowing therethrough.

22 Claims, 1 Drawing Sheet

ROTARY FLUID COUPLING

BACKGROUND OF THE INVENTION

A rotary fluid coupling provides direct fluid flow transfer between two elements which are rotatable relative to each other. While such rotary fluid couplings have been available previously, many are not designed to decrease the likelihood of microcontaminates entering the fluid flow passageway between the elements of the coupling. Further, many are not suitable for high pressure situations and evidence an undesirable tendency to leak.

SUMMARY OF THE INVENTION

Accordingly, the present invention provides a novel rotary coupling which is especially suitable for use in processing equipment used in manufacturing semi-conductor integrated circuits and similar components for the microcomputer industry by decreasing the likelihood of microcontaminates entering the fluid flow line. This novel rotary fluid coupling is further designed for high pressure situations and evidences a decreased tendency to leakage.

Specifically, a rotary fluid coupling is provided for interconnecting a fluid-conveying passageway in a spindle element to a duct in a second element, such that one element is rotatable with respect to the other element. The spindle element has an axial channel along the length of the spindle. A plate with a generally planar proximal face is mounted on the spindle. The spindle plate has a bore which is in axial alignment with and in fluid flow communication with the axial channel of the spindle. The bore and the channel generally form a single continuous fluid conveying passageway. The proximal face of the spindle plate is provided with a fluid flow resistance means for resisting any residual radial outward flow of fluid from the passageway. The rotary fluid coupling of the invention has a second element which has a second plate with a generally planar distal face. A fluid conducting duct extends from an aperture on the distal face of the second plate to a fluid source. The two faces are generally aligned in parallel planar relationship with each other, creating a fluid permeable gap between the two faces. When the rotary fluid coupling of this invention is in use, fluid flowing from the fluid source through the fluid conducting duct and the aperture in the second element crosses the fluid permeable gap to enter the fluid conveying passageway in the spindle element. The resistance means on the first plate tends to minimize any residual flow of fluid radially outward from the plates as the fluid crosses the gap.

In use, the rotary fluid coupling is preferably provided with a protective coating of a synthetic resin within the fluid conveying passageway. The fluid flow resistant means can be a labyrinth of concentric circular grooves.

The rotary fluid coupling of this invention is particularly suitable for use with substrate stripping, cleaning or treating apparatus of the type disclosed in U.S. Pat. No. 3,990,462 and in U.S. Pat. No. 4,132,567.

DETAILED DESCRIPTION OF THE INVENTION

Figure 2:
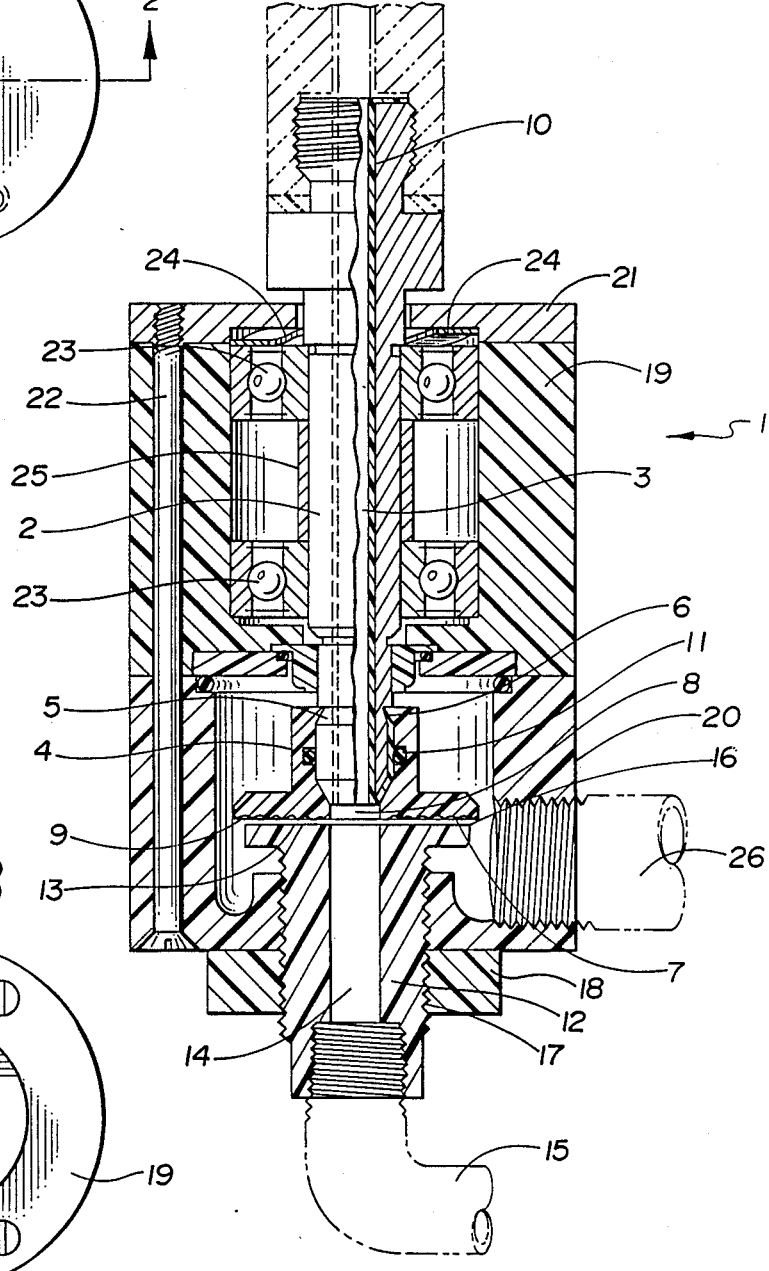
FIG. 2 illustrates an embodiment of the novel rotary fluid coupling.

With reference to the drawings, as shown in FIG. 2, the rotary fluid coupling 1 of this invention comprises a generally cylindrical spindle 2. The spindle 2 has an axial channel 3 along the length of the spindle 2. A first plate 4 is mounted on the spindle 2. Preferably, the first plate 4 attaches to the spindle 2 by a snap attachment between the snap-in relief 5 on the spindle 2 and the snap-in retention 6 on the first plate 4. The first plate 4 has a generally planar proximal face 7. The first plate 4 has a bore 8, which is in axial alignment with the channel 3 and in fluid flow communication with the channel 3. The bore 8 and the channel 3 generally form a single continuous fluid conveying passageway. The planar proximal face 7 of the first plate 4 is provided with a fluid flow resistance means for resisting any residual radial outward flow of fluid from the passageway. The fluid flow resistance means in the illustrated embodiment is representatively illustrated as a labyrinth 9 of concentric circular grooves. The rotary fluid coupling 1 may be coated inside the fluid conveying passageway with a temperature, chemical and pressure-resistant synthetic resin 10. Coating the interior surface of the bore serves to prevent any corrosion of the metallic surface by the action of the fluid flowing therethrough thus preventing the unwanted generation of microscopic particulate into the fluid flow line. Additionally, an O-ring, 11 may be provided between the spindle 2 and the first plate 4 to create a fluid-tight seal.

The spindle element 2, with the first plate 4 mounted thereon is illustrated in the representative embodiment as disposed above the second plate 12 with a generally planar distal face 13. A fluid conducting duct 14 extends from an aperture on the distal face 13 of the second plate 12 to a fluid source 15. The distal face 13 of the second plate 12 is generally aligned in parallel planar relationship with the proximal face 7 of the first plate 4, therby creating a fluid permeable gap 16 between the two faces 13 and 7, respectively.

In use, fluid flowing from the fluid source 15 flows through the fluid conducting duct 14 in the second plate 12, crosses the fluid permeable gap 16 to enter the fluid conveying passageway of the cylindrical spindle 3. The fluid flow resistance means, such as the labyrinth 9 tends to increase the pressure differential and the minimize any residual flow of fluid radially outward from the plates 4 and 12, respectively, as the fluid crosses the gap 16. Preferably, a gap distance adjustment is provided for adjusting the distance between the plates 4 and 12, respectively. In FIG. 2, the adjustment means is shown as an externally threaded shaft 17 in threaded engagement with a nut 18. Loosening the nut 18 allows adjustment of the gap 16 by turning the shaft 17. Once the desired gap 16 has been set, tightening the nut 18 locks the shaft 17 and maintains the set gap 16. In the illustrative embodiment of FIG. 2, the spindle element 2 and the first plate 4 mounted thereon are rotatable relative to the second plate 12.

Figure 1:
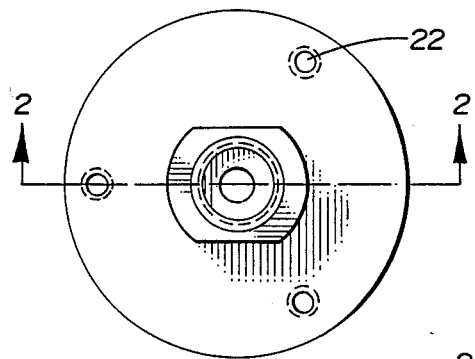
FIG. 1 is a top elevational view of the cover plate of the housing of the present rotary fluid coupling.
Figure 3:
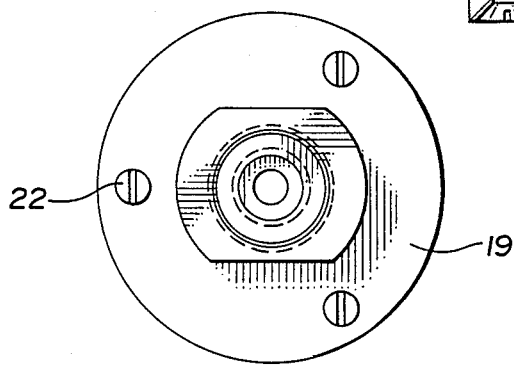
FIG. 3 is a bottom elevational view of the lower housing and the gap adjustment nut.

To maintain first plate 4 of the cylindrical spindle 3 and the second plate 12 in correct fluid flow relationship, the rotary fluid coupling 1 is retained within a suitable housing, such as shown in the illustrative FIG. 2. The housing may comprise an upper housing 19, a lower housing 20, and a cover plate 21, held together by assembly screws 22. FIG. 1 shows a top elevational view of the cover plate 21 and FIG. 3 shows a bottom elevational view of the lower housing 20 and the gap adjustment nut 18 with the assembly screws 22. To further maintain the gap 16 adjustment, a wave washer 24 (or washers) is spaced between the ball bearings 23 and the cover plate 20 of the upper housing 19 to maintain a downward load on the ball bearings 23.

The use of the present inventive rotary fluid coupling 1 decreases the likelihood of microcontaminates entering the fluid flow stream through the coupling. The purpose of the gap 16 is to maintain the integrity of a non-contact union between the plates 4 and 12, in order that they may not wear against and abrade each other under rotating use conditions. The gap 16 is pre-set to the smallest distance which will assure that the plates 4 and 12 maintain non-contact even under elevated temperature fluid flow conditions which may cause narrowing of the gap 16 due to thermal expansion of the plate materials. At the same time, the gap 16 must be small enough so that any outward fluid flow leakage does not detract from the required fluid flow rate, volume and pressure to be delivered through the rotary coupling. The plates are constructed of materials having the same or generally similar thermal coefficients of expansion so as to minimize any changes in the gap distance as fluids of differing temperatures are flowing therethrough. As has been previously already described, the gap 16 can be adjusted by loosening the nut 18 and turning the shaft 17. Then, retightening the nut 18 locks the shaft 17 to maintain the set gap 16 adjustment.

In operation, fluid, such as water or deionized water, travels from a fluid source 15 below the second plate 12 through a central aperture in the second plate 12 to a bore 8 in the first plate 4. To minimize leakage as the fluid passes through the fluid permeable gap 16 between the two plates 4 and 12, the first palte 4 bears a labyrinth 9, as of concentric circular grooves. To further minimize the possiblity of fluid leakage across the fluid permeable gap, overlapping labyrinths between the first and second plates may be provided. Owing to the difficulty in precisely machining such overlapping labyrinths, a single labyrinth on the first plate is presently preferred.

Even with the presence of a fluid flow resistant labryinth 9, some minimal leakage is detectable, generally not enough to detract from the required fluid flow rate, volume and pressure to be delivered through the rotary coupling. Any residual fluid flowing radially outwardly between the plates 4 and 12 is removed through the residual fluid outlet 26, which may be connected either to a non-pressurized drain or a fluid aspirator, not shown. The preferred operating pressure is generally between 15 to 20 psi with a flow rate of 1.2 gallons per minute.

Although the invention has been shown in connection with certain specific embodiments, it will be readily apparent to those skilled in the art that various changes may be made without departing from the scope of the invention as defined by the following claims.

What is claimed is:

1. A rotary fluid coupling for interconnecting a fluid-conveying passageway in a spindle element to a duct in a second element, at least one of said elements being rotatable relative to the other, said rotary fluid coupling comprising:

(a) a spindle element having an axial channel;

(b) a first plate mounted on said spindle, said first plate having a generally planar proximal face, a fluid flow resistance means on said proximal face, said first plate having a bore in axial alignment with and in fluid flow communication with said axial channel, such that said bore and said channel generally form a single continuous fluid conveying passageway;

(c) a second element having a second plate with a generally planar distal face and a fluid conducting duct extending from an aperture on said distal face of said second plate to a fluid source, said distal face of said second plate generally aligned in parallel planar relationship with said proximal face of said first plate, thereby creating a gap between said proximal face of said first plate and said distal face of said second plate, said gap being pre-set to maintain minimal non-contact between said faces and to maintain minimal residual flow of fluid radially outwardly between the plates as fluid crosses the gap, such that fluid flowing from said fluid source through said fluid conducting duct and said aperture in said second element, crosses the gap to enter the fluid conveying passageway, said resistance means tending to minimize any residual flow of fluid radially outwardly between the plates as the fluid crosses the gap.

2. The rotary fluid coupling of claim 1, wherein the resistance means is a labyrinth.

3. The rotary fluid coupling of claim 2, wherein the labyrinth is a series of generally circular, generally concentric grooves on the plate of the proximal face.

4. The rotary fluid coupling of claim 1, further comprising a chemical, temperature and pressure resistant coating within said fluid conveying passageway.

5. The rotary fluid coupling of claim 1, further comprising an aspirating means for removing any fluid that flows radially outwardly from the plates past the resistance means.

6. The rotary fluid coupling of claim 1, wherein the plates are constructed of materials having generally similar thermal coefficients of expansion.

7. The rotary fluid coupling of claim 1, wherein the second plate further comprises a second fluid flow resistance means on said distal face.

8. The rotary fluid coupling of claim 1, further comprising means for adjusting the gap distance between said plates.

9. The rotary fluid coupling of claim 8, wherein the adjusting means is operably connected to said second plate.

10. The rotary fluid coupling of claim 2, further comprising fluid-tight sealing means interposed between said spindle and said bore of said first plate.

11. The rotary fluid coupling of claim 10, wherein said fluid-tight sealing means is an O-ring.

12. A rotary fluid coupling for interconnecting a fluid-conveying passageway in a spindle element to a duct in a second element, at least one of said elements being rotatable relative to the other, said rotary fluid coupling comprising:

(a) a spindle element having an axial channel;

(b) a first plate mounted on said spindle, said first plate having a generally planar proximal face, said first plate having a bore in axial alignment with and in fluid flow communication with said axial channel, such that said bore and said channel generally form a single continuous fluid conveying passageway;

(c) a second element having a second plate with a generally planar distal face and a fluid conducting duct extending from an aperture on said distal face of said second plate to a fluid source, said distal face of said second plate generally aligned in parallel planar relationship with said proximal face of said first plate, thereby creating a gap between said proximal face of said first plate and said distal face of said second plate;

(d) a fluid flow resistance means on at least one of said proximal and distal faces;

(e) means for adjusting the gap distance between said plates;

said gap being pre-set to maintain minimal non-contact between said faces and to maintain minimal residual flow of fluid radially outwardly between the plates as fluid crosses the gap, such that fluid flowing from said fluid source through said fluid conducting duct and said aperture in said second element, crosses the gap to enter the fluid conveying passageway, said resistance means tending to minimize any residual flow of fluid radially outwardly between the plates as the fluid crosses the gap.

13. The rotary fluid coupling of claim 12, wherein a single fluid flow resistance means is located on said proximal face.

14. The rotary fluid coupling of claim 13, wherein the resistance means is a labryinth.

15. The rotary fluid coupling of claim 14, wherein the labyrinth is a series of generally circular, generally concentric grooves on the plate of the proximal face.

16. The rotary fluid coupling of claim 12, further comprisng a chemical, temperature and pressure resistance coating within said fluid conveying passageway.

17. The rotary fluid coupling of claim 12, further comprising as aspirating means for removing any fluid that flows radially outwardly from the plates past the resistance means.

18. The rotary fluid coupling of claim 14, wherein the plates are constructed of materials having generally similar thermal coefficients of expansion.

19. The rotary fluid coupling of claim 12, wherein the second plate further comprises a second fluid flow resistance means on said distal face.

20. The rotary fluid coupling of claim 12, wherein the adjusting means is operably connected to said second plate.

21. The rotary fluid coupling of claim 12, further comprising fluid-tight sealing means interposed between said spindle and said bore of said first plate.

22. The rotary fluid coupling of claim 21, wherein said fluid-tight sealing means is an O-ring.

* * * * *